United States Patent
Hager et al.

(10) Patent No.: US 8,525,031 B2
(45) Date of Patent: *Sep. 3, 2013

(54) LOW COST, HIGH PERFORMANCE FLEXIBLE REINFORCEMENT FOR COMMUNICATIONS CABLE

(75) Inventors: Thomas P. Hager, Westerville, OH (US); Richard N. Lehman, Newark, OH (US); James R. Priest, Nashport, OH (US)

(73) Assignee: Neptco JV LLC, Pawtucket, RI (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/045,579

(22) Filed: Mar. 10, 2008

(65) Prior Publication Data

US 2008/0310802 A1 Dec. 18, 2008

Related U.S. Application Data

(63) Continuation of application No. 10/246,007, filed on Sep. 18, 2002, now abandoned.

(51) Int. Cl.
*H01B 7/29* (2006.01)
(52) U.S. Cl.
USPC .......................................... 174/116; 385/102
(58) Field of Classification Search
USPC ................. 174/116, 120 R; 385/102
See application file for complete search history.

(56) References Cited

U.S. PATENT DOCUMENTS

| 2,723,215 A | 11/1955 | Biefeld et al. | |
| 3,299,177 A * | 1/1967 | Reding | 524/836 |
| 3,765,927 A | 10/1973 | Marzocchi | 117/72 |
| 4,636,437 A | 1/1987 | Algrim et al. | 428/391 |
| 4,659,753 A | 4/1987 | Tiburtius et al. | |
| 4,781,432 A | 11/1988 | Zongor et al. | 350/96.23 |
| 4,837,077 A | 6/1989 | Anton et al. | 428/240 |
| 4,874,219 A | 10/1989 | Arroyo et al. | 350/96.23 |
| 4,921,558 A | 5/1990 | Johnson et al. | 156/181 |
| 5,182,784 A | 1/1993 | Hager et al. | 385/128 |
| 5,286,562 A | 2/1994 | Girgis | 428/391 |
| 5,512,625 A | 4/1996 | Butterbach et al. | 524/490 |
| 5,736,220 A | 4/1998 | Tingley | 428/114 |
| 6,080,489 A * | 6/2000 | Mehta | 428/447 |

(Continued)

FOREIGN PATENT DOCUMENTS

DE 100 16 536 A1 10/2001
EP 0 291 023 A2 11/1988

(Continued)

OTHER PUBLICATIONS

Abstract in English of JP 01022982A, Derwent Acc-No. 1989-071749, 3 pages.

(Continued)

*Primary Examiner* — Chau Nguyen
(74) *Attorney, Agent, or Firm* — Mintz Levin Cohn Ferris Glovsky and Popeo, P.C.

(57) ABSTRACT

A low cost, high performance flexible reinforcement member that can be used for both optical and copper communications cable. The reinforcement members made according to the preferred process are more rigid than known reinforcement members, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques.

19 Claims, 8 Drawing Sheets

(56) References Cited

U.S. PATENT DOCUMENTS

| | | |
|---|---|---|
| 6,195,486 B1 | 2/2001 | Field et al. ............. 385/100 |
| 6,238,791 B1 | 5/2001 | Schell et al. ............ 428/392 |
| 6,380,298 B2 | 4/2002 | Flautt et al. ............. 524/500 |
| 6,746,762 B1 | 6/2004 | Hosoda et al. ........... 428/332 |
| 6,897,382 B2 * | 5/2005 | Hager et al. ............. 174/116 |
| 7,180,000 B2 * | 2/2007 | Hager et al. ............. 174/116 |
| 7,435,909 B2 * | 10/2008 | Hager et al. ............. 174/116 |
| 2003/0044139 A1 | 3/2003 | Norris et al. ............. 385/113 |
| 2008/0310801 A1 * | 12/2008 | Hager et al. ............. 385/102 |

FOREIGN PATENT DOCUMENTS

| | | |
|---|---|---|
| EP | 0 685 855 A1 | 12/1995 |
| EP | 1 076 253 A2 | 2/2001 |
| GB | 1 485 253 | 9/1977 |
| JP | 62053309 A | 3/1987 |
| JP | 64-22982 | 1/1989 |
| WO | 9115434 A1 | 10/1991 |
| WO | 9623024 A1 | 8/1996 |
| WO | WO 99/59166 * | 11/1999 |

OTHER PUBLICATIONS

Shih et al., "Peel Adhesion and Viscoelasticity of Poly (ethylene-co-vinyl acetate)-Based Hot Melt Adhesives. I. The Effect of Tackifier Compatibility", *J. Applied Polymer Sci.*, 63(3)323-331 (1997).

* cited by examiner

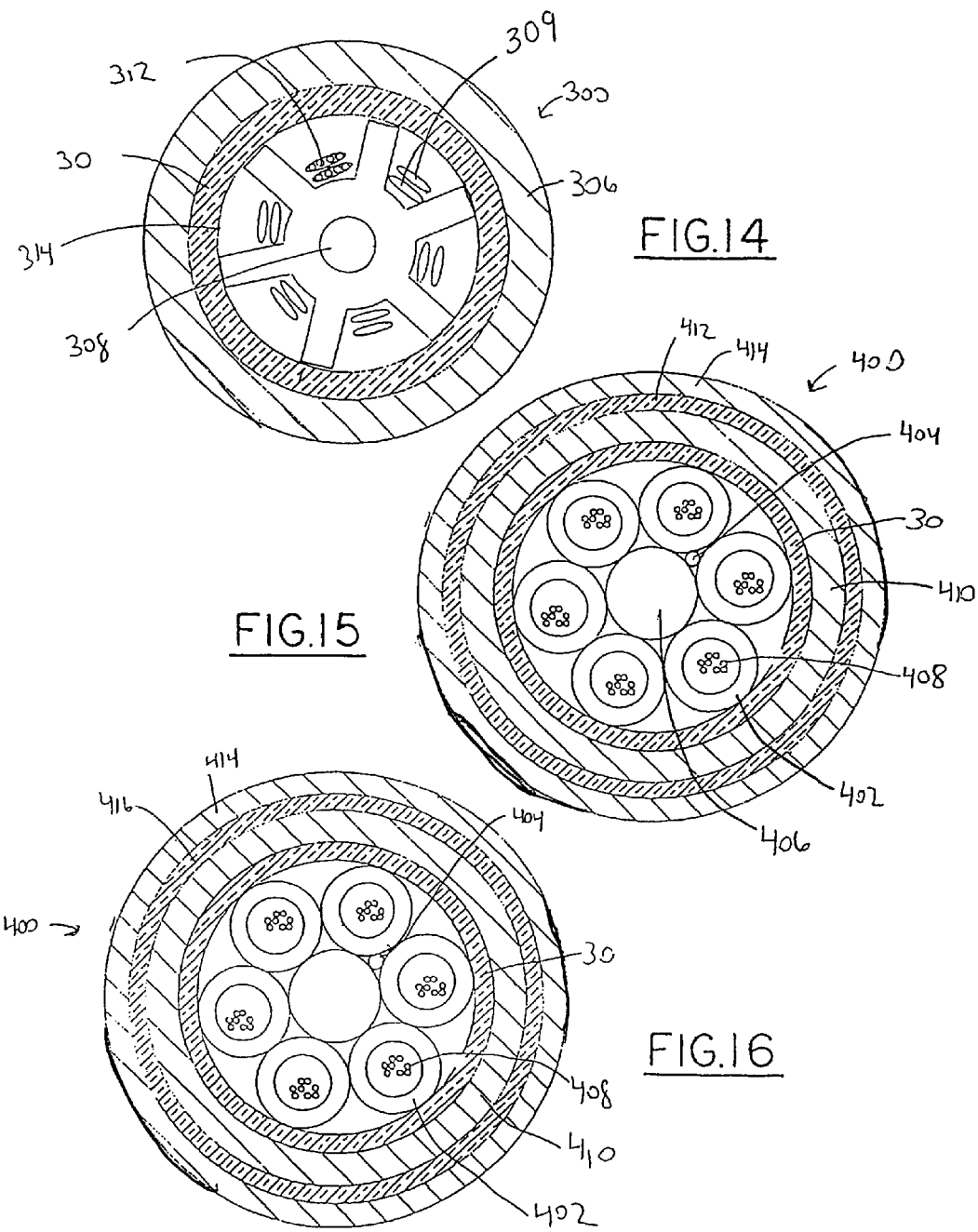

LOW COST, HIGH PERFORMANCE FLEXIBLE REINFORCEMENT FOR COMMUNICATIONS CABLE

CROSS-REFERENCE TO RELATED APPLICATIONS

This application is a continuation application of U.S. patent application Ser. No. 10/246,007, entitled "Low Cost, High Performance Flexible Reinforcement For Communications Cable," filed on Sep. 18, 2002, the disclosure of which is incorporated herein in its entirety by reference.

TECHNICAL FIELD AND INDUSTRIAL APPLICABILITY OF THE INVENTION

The present invention relates generally to reinforced communication cables and more specifically to low cost, high performance flexible reinforcement for communications cables.

BACKGROUND OF THE INVENTION

The market for telecommunications cable and related products is in an over capacity state. The large number of suppliers of these products has put tremendous pressure on the industry to provide communications cable with increased performance at lower costs.

optical communications cables consist essentially of a plurality of randomly placed optical communication fibers, typically in ribbon form, contained within a polymer jacket. Of course, other types of communications cables can have single optical fibers, bundled optical fibers, or tight buffered optical fibers. The fibers are typically tight or loose buffered within a polymer tube contained within a portion of the jacket. One or more flexible reinforcement members and stiff strength members may also be contained within a portion of the polymer jacket outside of the central tube or buffer tubes to provide support and prevent kinking of the communication fibers. These reinforcement members are applied by being wrapped helically around the inner core prior to outer jacketing (as in optical loose tube cable types) or are directly extruded into the jacket matrix (as in twisted copper telephone cable).

The flexible reinforcements for cables are made in a wide variety of methods. Typically, these reinforcements are manufactured by first applying a binder and sizing containing a film former and oils or coupling agents to a glass strand and then applying a relatively heavy layer of a water-based, high molecular weight polymer latex or wax. The coated strands may then be introduced to the communications cables by known methods.

These coatings may impart many important properties to the flexible reinforcements both during manufacture and after introduction to the cable. For example, these coatings prevent abrasion of the glass fibers during the combination with the reinforcement and during deployment. Also, these coatings prevent adhesion of the reinforcing fibers to the polymer jacket. These coatings may also impart adhesion if desired to the polymer jacket, for example, as is the case with polyvinyl chloride (PVC) jacketed communications cables. Additionally, these coatings can be super absorbent and can thus prevent water seepage from damaging the optical fibers.

One problem with presently available reinforcements is that they are relatively expensive to manufacture. For example, a relatively heavy layer of high molecular weight polymer latex or wax must be applied to the fibers in order to impart the mechanical properties necessary for optical and copper telecommunications cables. Also, these high molecular weight polymers have extremely high melt viscosities. Further, air can be trapped within the interstices of the fibers themselves after the introduction of the high molecular weight polymers, which can lead to premature degradation of the fibers and strand deficiencies. Also, because water-based high molecular weight coatings are typically used, a high-energy water-removal step is required before the fiber reinforcements can be introduced into the cabling. These water-based coatings, typically in emulsion form, are expensive as well.

SUMMARY OF THE INVENTION

A low cost, high performance flexible glass reinforcement member is provided that can be used for both optical and copper communications cables. The reinforcement members made according to the preferred process are more rigid than glass reinforcement members made according to the prior art as described above, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques such as blowing-in installation.

This flexible reinforcement member is made in one of two distinct methods. In a first preferred embodiment, the member is made by first melting and then applying a low molecular weight, low melt viscosity thermoplastic material, such as modified or unmodified polyethylene or wax, to fiber material.

The fiber material can be a glass strand or bundle, or combination of strand and bundle that penetrates the interstices within and between the fibers. Glass fibers that may be used include E-type glass fibers or ECR-type glass fibers such as Advantex® type glass fibers, both available from Owens Corning. Additionally, other fibrous materials can be used such as: duPont de Nemours Kevlar® aramid or Teijin Twaron® aramid; Toyobo Zylon® poly(p-phenylene-2,6-benzobisoxazole) (PBO); carbon fibers such as Hercules polyacrylonitrile Magnamite carbon fibers; high silica glass such as S-2 Glass®, Zentron®, Vetron® or other high strength glass from Advanced Glass Yarns (Aiken, S.C.) or other glass manufacturers; high tenacity, linear, high molecular weight polyethylene Spectra® fiber from Honeywell Performance Fibers (Colonial Heights, Va.); or other high modulus reinforcements. The term "high modulus" is defined as the modulus of elasticity, also known as Young's Modulus, which is a coefficient of elasticity representing the ratio of stress to strain as a material is deformed under dynamic load. It is the measure of softness or stiffness of a material. In the case of "high modulus" reinforcements, the values for the stress to strain ratio will typically exceed 30 GPa. For the above examples, the typical elastic modulus of each are as follows: E-Glass=72 GPa; aramid=124 GPa (depending on aramid type); PBO=280 GPa; carbon fibers=228 GPa; S-2 Glass® fiber=90 GPa; linearized polyethylene fiber=113 GPa.

This wax material is air cooled prior to the introduction of a second layer of nonwater-based high molecular weight ("MW") polymer, such as EAA, that is applied to the strand in an extruder or similar device. The high molecular weight polymer surrounds the strands, but does not penetrate. The high MW polymer is tough, but flexible, and gives the strand mechanical properties for use in cable systems. The overall amount of high MW polymer applied to the strand is less than is present in cables of the prior art.

In another preferred embodiment, the member is made by first applying a low molecular weight, thermoplastic blend of a blend of low molecular weight, low melt viscosity and high molecular, relatively high melt viscosity thermoplastic or thermoplastic elastomeric material to the fiber material. An example of this is a blend of microcrystalline wax and a plasticized styrene butadiene rubber. The blend penetrates the interstices within and between the fibers to form a member having adequate mechanical properties. As a topcoat is not needed, a cost savings is realized in terms of manufacturing and raw material costs. Of course a topcoat could still be applied if so desired.

This flexible reinforcement made according to these preferred processes exhibit lower amounts of trapped air that is typically trapped within the strands and/or bundles, thereby decreasing the likelihood and amount of potential degradation within the fiber. The method also prevents strand deficiencies such as fiber-fiber abrasion and water penetration, and can thereby increase the strength of the strands, and hence the reinforcement, without the application of a heavy layer of high MW polymer. Further, by not using a water-based coating, additional savings is realized by both in terms of the water removal and raw material costs.

Other objects and advantages of the present invention will become apparent upon considering the following detailed description and appended claims, and upon reference to the accompanying drawings.

BRIEF DESCRIPTION OF THE DRAWINGS

FIGS. 9-20 illustrate communications cables having the flexible reinforcement members of FIGS. 1-3 and FIGS. 5-7.

DETAILED DESCRIPTION AND PREFERRED EMBODIMENTS OF THE INVENTION

Figure 1:
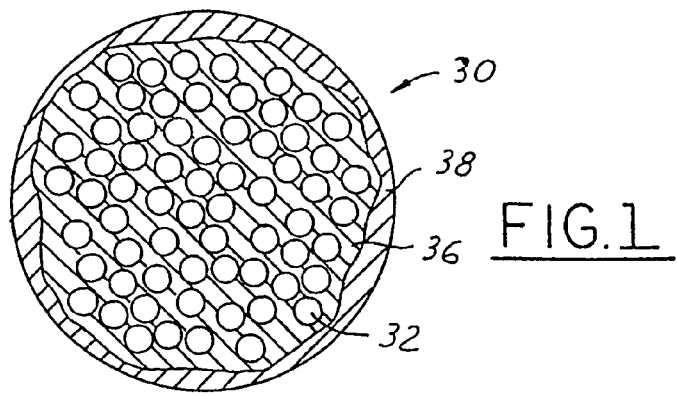
FIG. 1 is a cross-sectional view of a flexible reinforcement member according to a preferred embodiment of the present invention.
Figure 2:
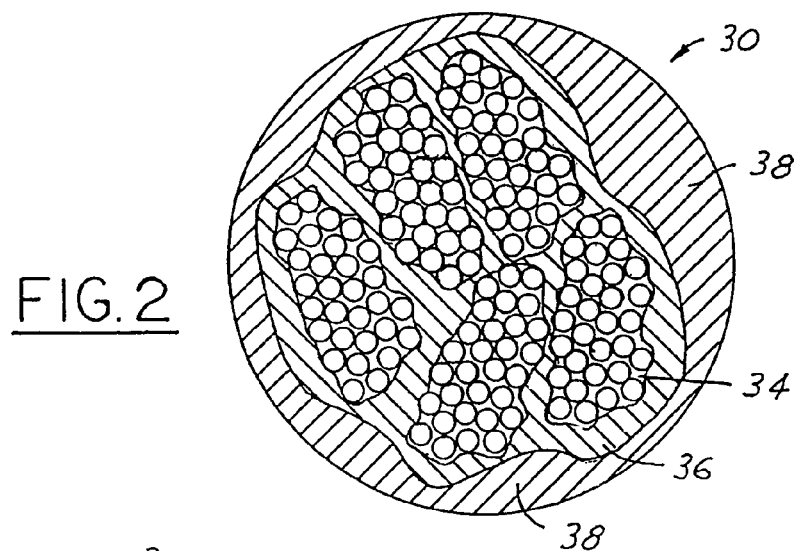
FIG. 2 is a cross-sectional view of a flexible reinforcement member according to a preferred embodiment of the present invention.
Figure 3:
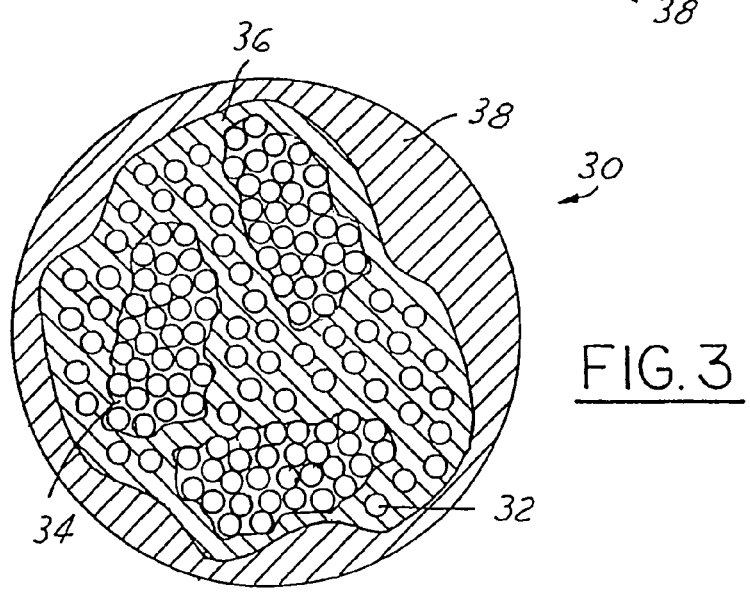
FIG. 3 is a cross-sectional view of a flexible reinforcement member according to a preferred embodiment of the present invention.

The present invention relates to a new flexible reinforcement member that may be used in telecommunication cables such as optical cables or copper cables. FIGS. 1-3 below illustrate three preferred embodiments of the flexible reinforcement member.

FIG. 1 illustrates a cross-sectional view of the flexible reinforcement member 30 according to a preferred embodiment of the present invention. The member 30 is comprised of a strand having a plurality of single filaments 32 of glass fibers saturated with a primary saturant 36 and coated with a higher molecular weight polymer topcoat 38.

Referring now to FIG. 2, another preferred embodiment shows the member 30 having a plurality of strand bundles 34 replacing the individual filaments 32. Also, FIG. 3 depicts the member 30 as having a combination of both filaments 32 and bundles 34. Again, in both FIGS. 2 and 3, the fibers that comprise the filaments 32 and/or bundles are saturated with the primary saturant 36 and coated with the topcoat 38.

The filaments 32 and bundles 34 are preferably glass fibers such as E-type glass fibers or ECR-type glass fibers such as Advantex® type glass fibers, both available from Owens Corning. These glass fibers are preferably sized with one of Owens Corning's sizing compositions prior to introduction within the member 30. Preferably Owens corning sizing 158B, 111A or 366 is used; however, other epoxy/silane, vinylester, polyester, or starch/oil type sizings available from many manufacturers may also be used. The filaments 32 are preferably filamentized strands and are approximately 11-26 microns in diameter. The bundles 34 preferably comprise filaments of approximately 13 microns in diameter, with approximately 1000-2000 filaments per bundle 34 and have a linear density of approximately 200-4800 grams/kilometer.

The saturant 36 fills in the interstices between the strands 32 and/or bundles 34 and comprises about 0.1-35 percent, and more preferably about 15 percent, of the total weight of the member 30. The saturant 36 also fills the voids within the filaments 32 and/or bundles 34 caused by abrasions and or defects in the manufacturing process. In this way, the saturant 36 functions to lower the amount of air that is typically trapped between the filaments 32 and bundles. The saturant also lowers the amount of air that may be trapped within the bundles 34. The saturant 36 also prevents filament 32 deficiencies such as fiber-fiber abrasion, water penetration, and can increase the strength of the filaments 32. In these ways, the saturant 36 increases the strength of the member 30.

Preferably, the saturant 36 comprises a low molecular weight mineral wax having melting points under approximately 300 degrees Celsius, preferably less than 150 degrees Celsius and most preferably between about 100 and about 120 degrees Celsius and melt viscosities of less than approximately 1000 centipoise (cps), preferably less than 500 centipoise, that allow easy saturation into the fiber strands 32 or bundle 34. One preferable mineral wax is a microcrystalline wax such as Witco Chemical's Multiwax, which has a melting point of approximately 70-80 degrees Celsius (160-170 degrees Fahrenheit) and a melt viscosity of approximately 50-100 cps. Other examples of mineral waxes that may also be used include polyalphaolefin waxes, such as Baker Petrolite Vybar 260, and polyethylene waxes, such as Baker Petrolite Polywax 100. Additionally, modified polyethylenes and polypropylenes may also be used, such as Eastman Chemicals Epolene E-15 and E-43 oxidized polyethylene or Epolene G-3015 maleated polypropylene.

The high molecular weight polymer topcoat 38 surrounds the saturant 36, but does not penetrate within the saturant 36 to the filaments 32 and bundle 34. The topcoat 38 comprises approximately 0.1-35 percent, preferably between about 5 and about 20 percent and more preferably between about 10 and about 15 percent, of the total weight of the member 30. The topcoat 38 is tough, but flexible, and gives the member 30 its mechanical properties. The topcoat 38 is a higher modulus coating that changes the characteristics of the member 30.

The topcoat 28 offers polyethylene adhesion and stiffen the member 30. Table 1 shows the polyethylene adhesion of individual glass strands according to ASTM D1871, Test Method #53. If water swellable topcoats are used, the member 30 could provide additional water protection capabilities.

TABLE 1

Polyethylene Adhesion Individual Strand Pull-Outs (lbf/0.5 in)

|    | Wax Only | Wax + EAA Topcoat | DHM 712 Only | DHM 712 + EAA Topcoat | DHM 712/EAA 70:30 Blend |
|----|----------|-------------------|--------------|-----------------------|--------------------------|
| 1  | 21.9 | 54.9 | 24.7 | 58.9 | 65.5 |
| 2  | 31.5 | 56.0 | 32.3 | 60.5 | 19.1 |
| 3  | 33.1 | 70.5 | 41.3 | 51.5 | 62.3 |
| 4  | 32.5 | 63.1 | 52.8 | 50.9 | 53.1 |
| 5  | 38.8 | 64.6 | 40.3 | 70.1 | 13.7 |
| 6  | 27.1 | 55.8 | 39.1 | 48.4 | 85.6 |
| 7  | 28.1 | 74.1 | 49.3 | 48.2 | 32.9 |
| 8  | 14.4 | 61.1 | 21.4 | 68.6 | 40.9 |
| 9  | 29.3 | 91.5 | 32.5 | 66.1 | 41.5 |
| 10 | 18.1 | 68.1 | 37.4 | 61.0 | 70.8 |
| 11 | 27.7 | 46.6 | 43.1 | 61.3 | 70.5 |
| 12 | 26.9 | 68.3 | 32.9 | 68.2 | 28.7 |
| 13 | 22.5 | 68.6 | 39.5 | 61.8 | 75.0 |
| 14 | 26.6 | 64.5 | 31.8 | 57.2 | 74.8 |
| Average | 27.0 | 64.8 | 37.0 | 59.5 | 52.5 |
| Std. Dev. | 6.3 | 10.6 | 8.6 | 7.4 | 23.0 |
| C.I. | 4 | 7 | 6 | 5 | 16 |
| Upper | 31 | 72 | 43 | 65 | 68 |
| Lower | 23 | 58 | 31 | 54 | 37 |

Test was strand pull out from polyethylene plaques.
Raw data recorded in pounds of force per 0.5 inch imbedded strand.
Polyethylene was cable jacketing grade, black compounded.
Pulls done at room temperature.
Test method used: ASTM D1871 Adhesion of Glass to PVC; Test Method #53.

One preferred topcoat 38 is an ethylene acrylic acid (EAA) polymer such as Dow Chemical's Primacor 5986 or 5990I ethylene acrylic acid resin, which is useful if adhesion to a polyethylene jacket is required. Other polymers that may comprise the topcoat 38 include polyethylene (PE) or polypropylene (PP) polymers, or copolymers of PE and PP, available from manufacturers such as Dow Chemical, Shell, and Basell. Still further preferable topcoats 38 include ethylene vinyl acetate (EVA) copolymers, styrene-butadiene-styrene (SBS), polybutadiene terephthlate polyether glycol (PBT-PEG), polyamide or many other polyolefins and thermoplastic elastomers available from manufacturers such as Henkel, GLS and E.I. Du Pont de Nemours. Of course, as one skilled in the art would appreciate, the ultimate choice of topcoats 38 is dependent upon the end use of the communications cable having the reinforcement member 30.

Figure 4:
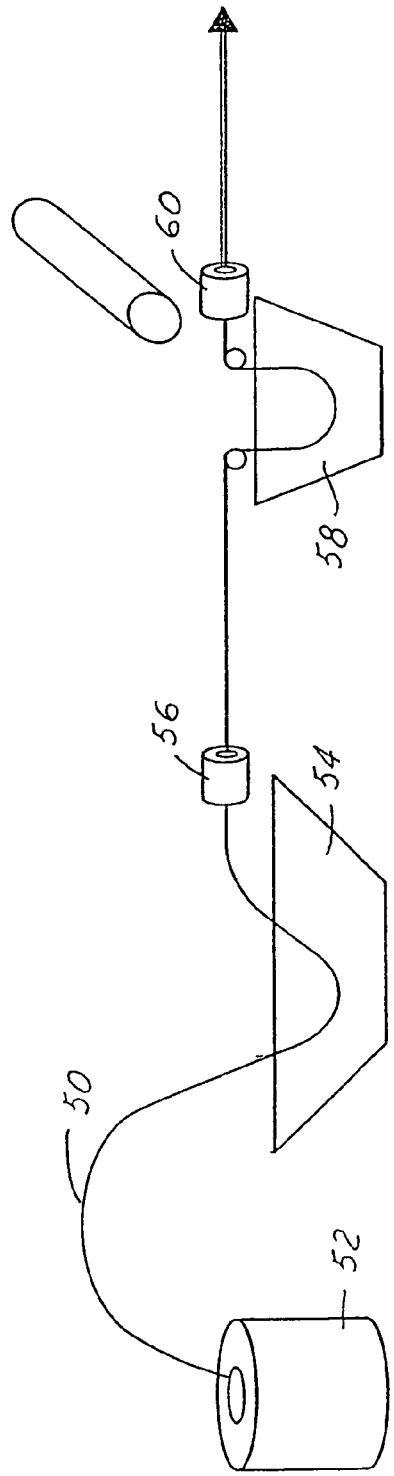
FIG. 4 illustrates an assembly line used for making the flexible reinforcement member according to FIG. 1-3.

FIG. 4 illustrates the process for making the members 30 of FIGS. 1-3. The process begins by unrolling the fibers 50 from a reel 52. The fibers 50 represent filaments 32, bundles 34, or a combination of filaments 32 and bundles as depicted in FIGS. 1-3. The fibers 50 are introduced to an application device 54, here a heated immersion bath 54 that holds the saturant 36. The bath 54 is maintained between approximately 90-100 degrees Celsius (200-210 degrees Fahrenheit) such that the primary saturant 36 has a viscosity of approximately 50-100 cps.

The coated fibers 50 exit the bath 54 and are introduced to a stripper die 56. In the embodiment shown in FIG. 5, the stripper die 56 has an internal diameter of approximately 0.84 millimeters (0.033 inches) to strip back the excess saturant 36 and to help impregnate the fibers 50. The coated fibers 56 are then introduced to an applicator 58 containing the topcoat 38.

Preferably, the applicator 58, as shown here, is a Nordson hot melt applicator 58. The topcoat 38 enters the applicator 58 through an orifice (not shown) For Dow Primacor 5990I, which has a melt point index of 1300 grams per 10 minutes, the material is heated to approximately 125 degrees Celsius (257 degrees Fahrenheit) as it enters the fixed orifice through a thick hose (not shown) and applied to the fibers 50. The fibers 50 exit the applicator 58 and enter a second stripper die 60 having an inner diameter of approximately 1.12 millimeters (0.044 inches). The second stripper die 60 removes excess topcoat 38 and smoothes the outer surface of the topcoat 38. The topcoat is then cooled to form the reinforcement member 30.

In an alternative embodiment not shown, an extruder using a crosshead die or similar applicator apparatus may be used in place of the applicator 58 to introduce the topcoat 38 to the coated fibers 50.

Figure 7:
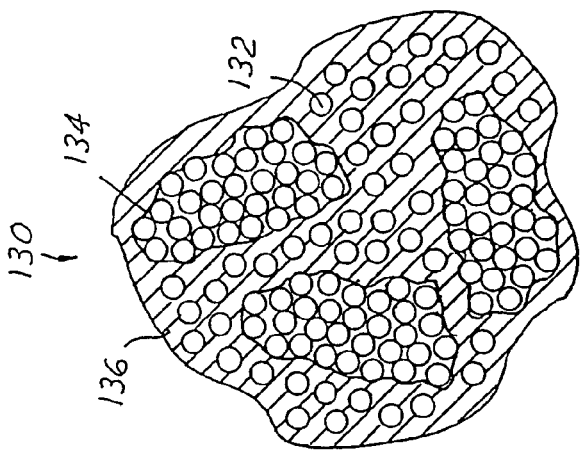
FIG. 7 is a cross-sectional view of a flexible reinforcement member according to a preferred embodiment of the present invention.
Figure 6:
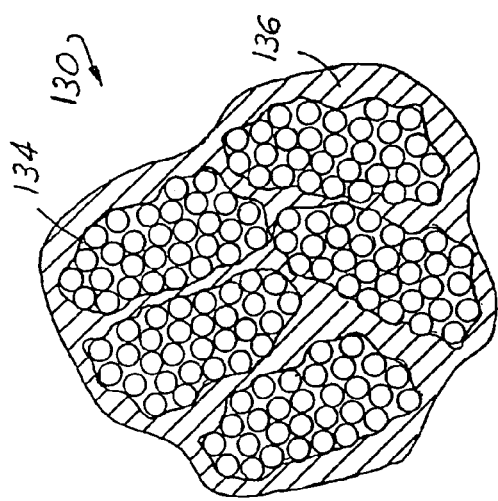
FIG. 6 is a cross-sectional view of a flexible reinforcement member according to a preferred embodiment of the present invention.
Figure 5:
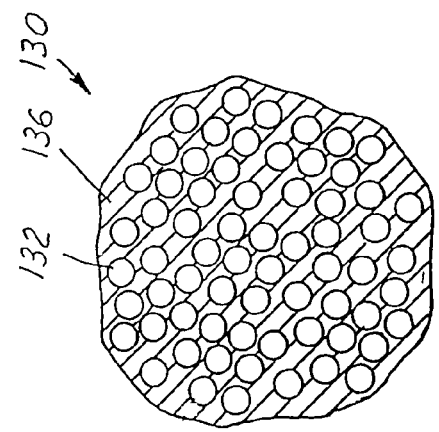
FIG. 5 is a cross-sectional view of a flexible reinforcement member according to a preferred embodiment of the present invention.

While the members 30 as shown in FIGS. 1-4 above exhibit excellent mechanical properties, the application of the topcoat 38 to the fibers 50 can be difficult due to the high viscosity nature of the topcoat 38 material. FIG. 5-7 illustrates an alternative method for making a flexible reinforcement member 130 that address these issues. The embodiments utilize the same strand and/or bundle design as shown FIGS. 1-3, but utilize a different low molecular weight primary saturant 136 to achieve the desired mechanical properties of the members 130 without the need for the topcoat.

Thus, as shown in FIG. 5, the member 130 is comprised of a strand of a plurality of single filaments 132 of glass fibers, while FIG. 6 utilizes bundles 134, and FIG. 7 utilizes combinations of filaments 132 and bundles 134 saturated with a low molecular weight primary saturant 136.

Here, the primary saturant 136 is a 90/10 to 10/90 by weight blend, and more preferably a 50/50 by weight blend, of a microcrystalline wax and styrene butadiene rubber ("SBR") compound. As above, one preferred microcrystalline wax that may be used is Witco Chemical's Multiwax. One preferred SBR compound used in the saturant 136 is DHM 712, available from DHM Adhesives, Inc. The DHM 712 has a softening point of approximately 95 degrees Celsius (203 degrees Fahrenheit) and a viscosity of 2250 cps at 177 degrees Celsius (350 degrees Fahrenheit). Blends of other high and low viscosity thermoplastic polymers or highly plasticized polymers can be similarly used, as long as the primary saturant material has less than 500 cps melt viscosity.

Figure 8:
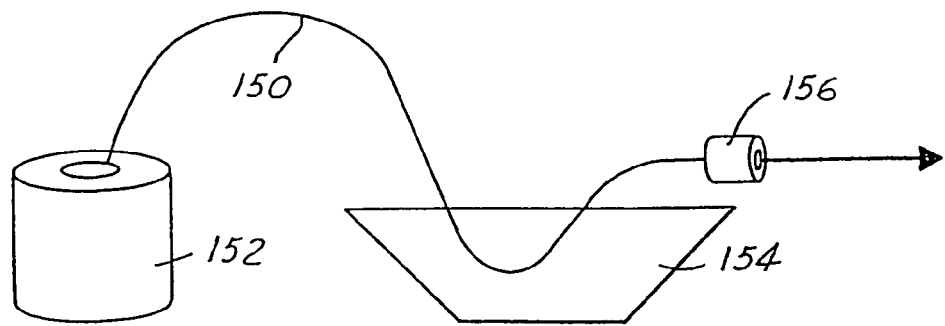
FIG. 8 illustrates an assembly line used for making the flexible reinforcement member according to FIG. 5-7.

FIG. 8 illustrates the process for making the members 30 of FIGS. 5-7. The process begins by unrolling the fibers 150 from a reel 152. The fibers 150 represent strands 132, bundles 134, or a combination of strands 132 and bundles 134 as depicted in FIGS. 5-7. The fibers 150 are introduced to a first application device 154, here a heated immersion bath 154, that holds the saturant 136. The bath 154 is maintained between approximately 120-150 degrees Celsius (250-300 degrees Fahrenheit) such that the primary saturant 136 has a viscosity of approximately 50-100 cps. The coated fibers 150 exit the bath 154 and are introduced to a stripper die 156. In the embodiment shown in FIG. 8, the stripper die 156 has an internal diameter of approximately 0.84 millimeters inches) to strip back the excess saturant 136 and to help impregnate the fibers 150. The coated fibers 150 are then cooled to form the reinforcement member 130 having a diameter of between approximately 0.5 and 1.0 mm.

The flexible reinforcement members 30, 130 of FIGS. 1-3 and 5-7 are then available to be inserted into a communications cable by known techniques. FIGS. 9-20 illustrate many of the possible types of communications cables utilizing these flexible reinforcement members 30, 130. Each is described below.

FIGS. 9-14 illustrate a 48-fiber "Dry Cable" structure 300 according to six preferred embodiments of the present invention. Each of these structures 300 having the flexible reinforcement member 30 or 130 offers increased strength and flexibility as compared to structures with traditional reinforcement members.

Figure 9:
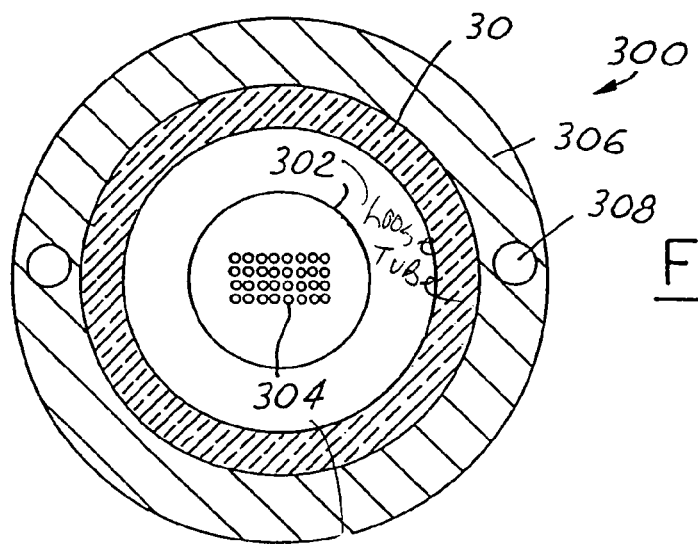

As shown in FIG. 9, the structure 300 comprises a gel-filled loose tube 302 having an optical fiber ribbon 304. The loose tube 302 is surrounded by the flexible reinforcement member 30 and covered with a high density polyethylene ("HDPE") sheath 306. Also shown is a strength member 308, which could in this case be made by either the present invention or by conventional thermosetting processes.

Figure 10:
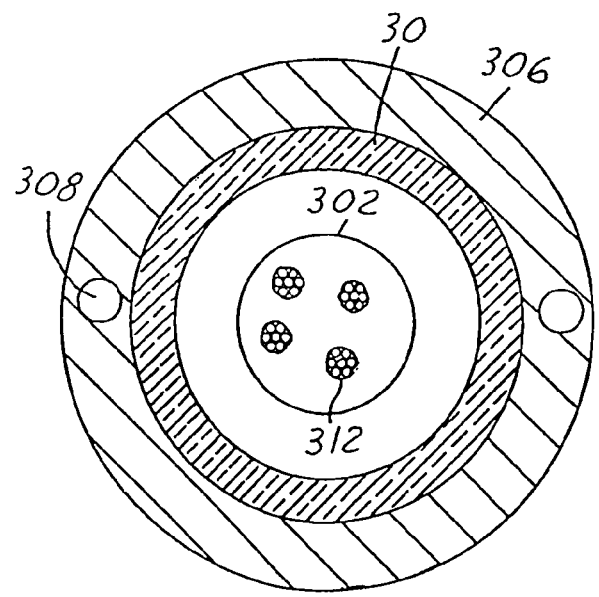

In FIG. 10, the optical fiber ribbon 304 is replaced with a plurality of optical fiber bundles 312 contained within the gel filled loose tube 302.

Figure 11:
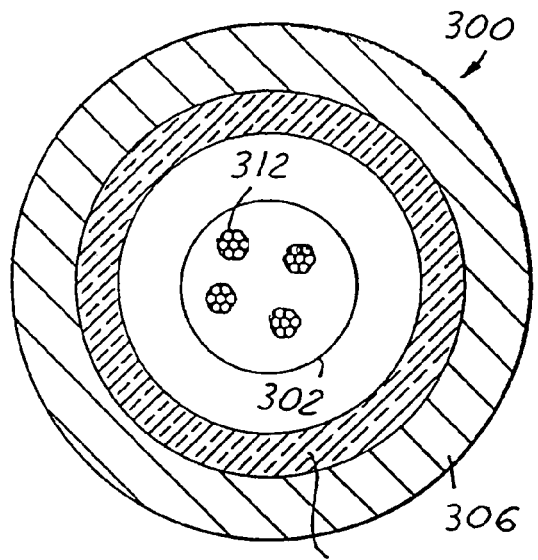
Figure 12:
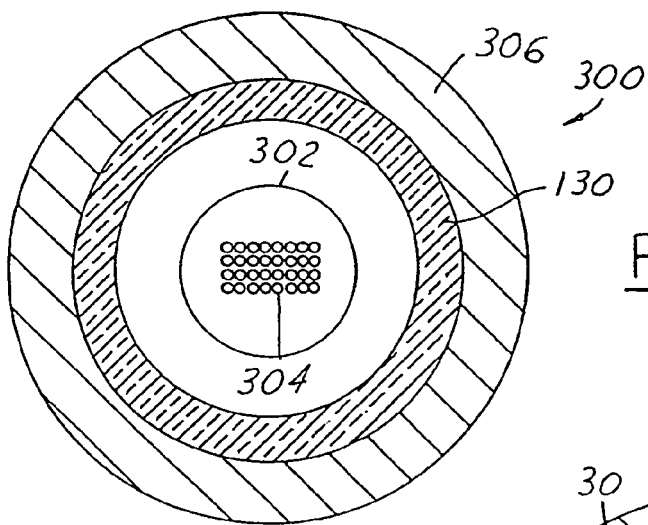

In FIGS. 11 and 12, the flexible reinforcement member 130 replaces the flexible reinforcement member 30 of FIGS. 10 and 9, respectively. These embodiments also do not require the rigid strength members 308.

Figure 13:
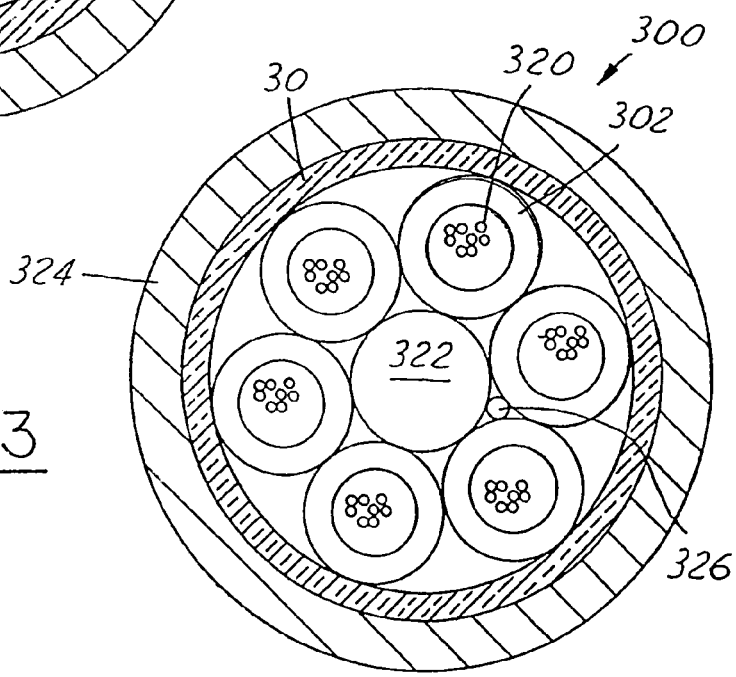

Referring to FIG. 13, a plurality of gel filled loose tubes 302 each filled with individual optical fibers 320 is shown surrounding a rigid central strength member 322. The flexible reinforcement member 30 then surrounds the loose tubes and is covered with an HDPE sheath 324. Also shown is a water swellable thread 326.

In FIG. 14, a water blocking tape 314 is introduced between the flexible reinforcement member 30 and the optical fiber bundles 312 as an additional moisture barrier layer. Here, the rigid strength member 308 is centrally located and within a slotted core structure containing the optical fiber bundles 312 within slots 309. The strength member is not within the HDPE sheath 306 as in FIGS. 9-12.

FIGS. 15-18 illustrate a 48-fiber "Rodent Resistant Cable" structure 400 according to five preferred embodiments of the present invention. Each of these structures 400 having the flexible reinforcement member 30 or 130 offers increased strength and flexibility as compared to structures with traditional reinforcement members.

Referring now to FIG. 15, the structure 400 comprises a gel filled loose tube 402 and a water swellable thread 404 surrounding a central strength member 406. Each loose tube 402 has a plurality of loose optical fibers 408 and is surrounded by the flexible reinforcement member 30, an inner HDPE sheath 410, a layer of glass tape reinforcement 412, and an outer HDPE sheath 414.

Figure 17:
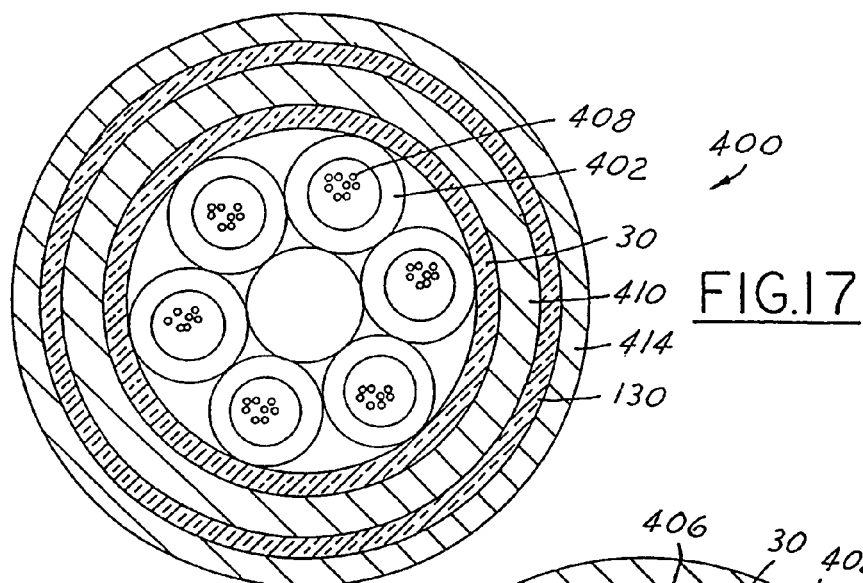

In FIG. 16, a layer of glass flex reinforcement 416 replaces the glass tape reinforcement 412. In FIG. 17, a layer of flexible glass reinforcement 130 replaces the glass tape reinforcement 412.

Figure 18:
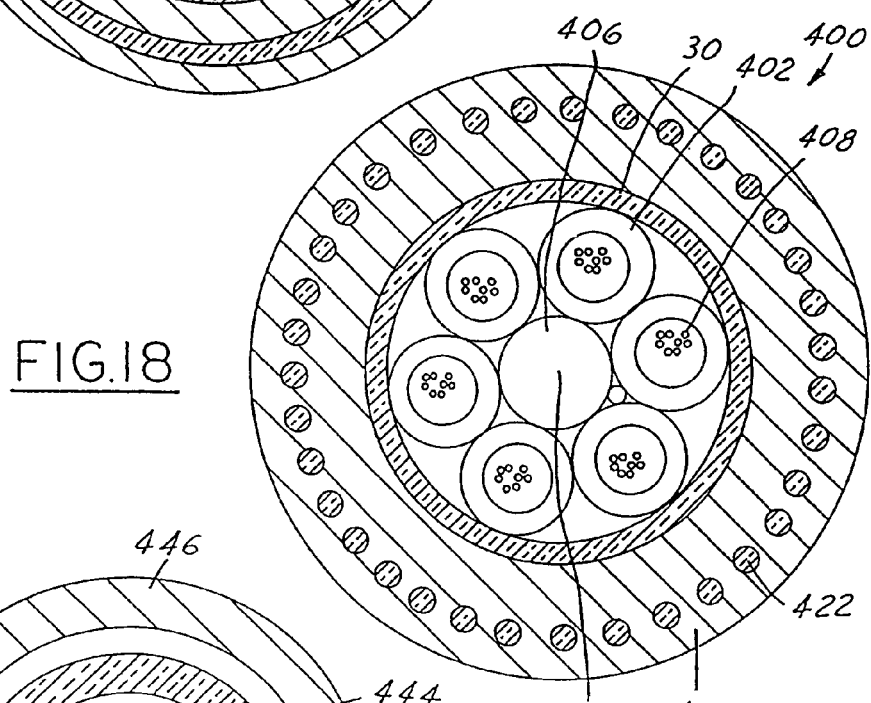

Referring now to FIG. 18, the loose tubes 402 are first surrounded by the flexible reinforcement member 30 which is surrounded by an outer HDPE sheath 420 having a plurality of fiber glass reinforcing rods 422. The rods 422, typically about 1.3 mm in diameter, are preferably evenly spaced within the HDPE sheath 420 and equidistant from a point 426 defining the center of the central strength member 406.

Figure 19:
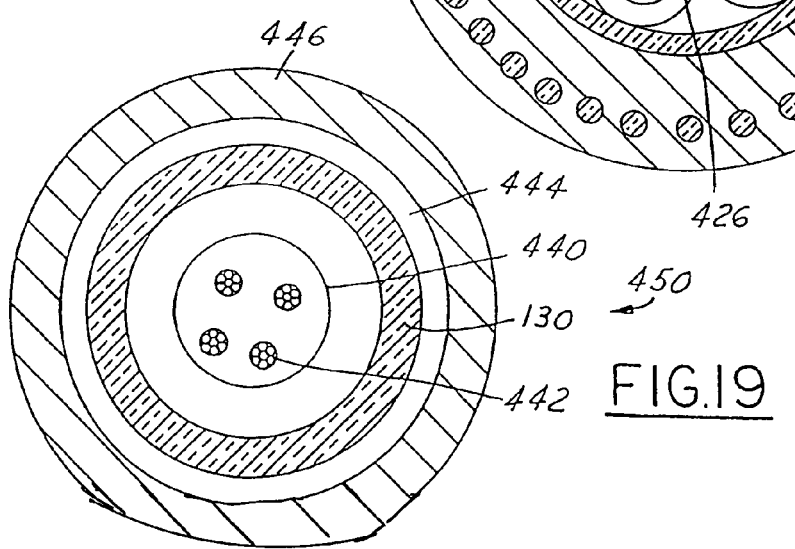

In FIG. 19, a buffer tube cable 450 according to another preferred embodiment comprises a gel filled loose tube 440 having a plurality of optical fiber bundles 442 that is surrounded by a flexible reinforcement member 130. The member 130 is then surrounded by a 0.4 mm thick layer of Nylon 12 sheath 444 and an outer HDPE sheath 446.

Figure 20:
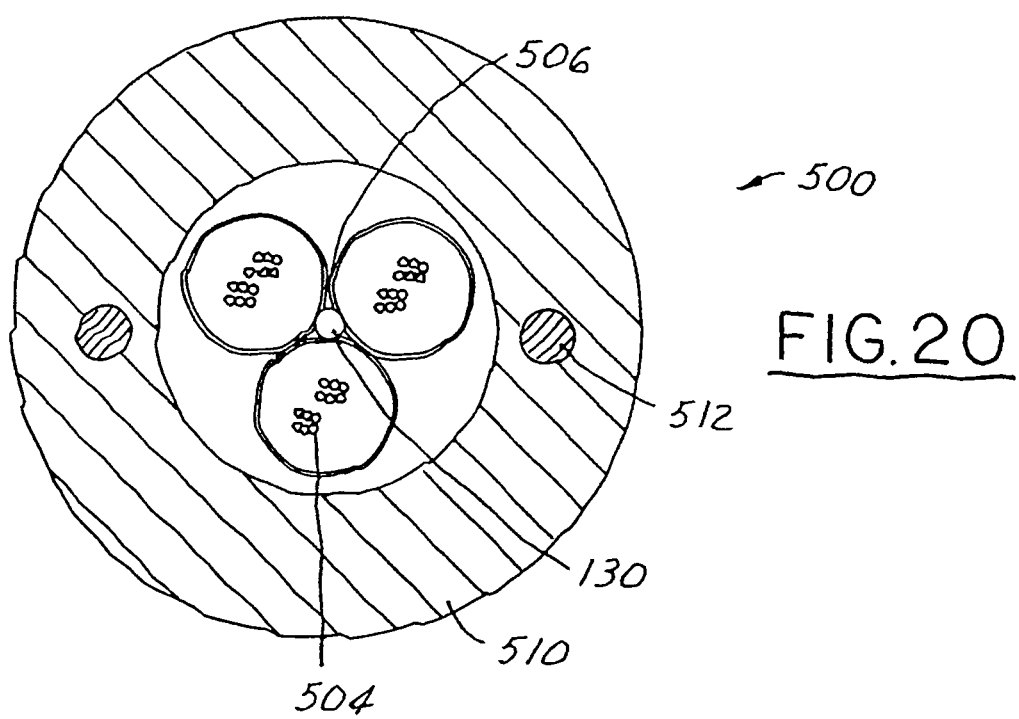

Referring to FIG. 20, a buffer tube cable 500 according to another preferred embodiment is shown as having a plurality of buffer tubes 502 each having 12 optical fibers 504 surrounding a flexible reinforcement member 130 having a waterblocking coating 506. A layer of waterblocking tape 508 surrounds the buffer tubes 502 which is surrounded by an outer HDPE sheath 510 having a plurality of rigid rod strength members 512.

The embodiments as shown in FIGS. 9-20 illustrate the wide range of potential embodiments using the flexible reinforcement members 30, 130 of FIGS. 1-3 and 5-7 for use in optical fiber type communication cable systems. Of course, these members 30, 130 could be used in other systems as well, including, for example, copper communication cable systems.

The present invention offers many advantages over the prior art. Because the cable structures 300, 400, 500 having these reinforcement members 30, 130 are lighter than communications cables having traditional glass reinforcement members, installation of these cables within ducts in underground cable systems using known installation techniques such as blowing-in installation is possible, in which compressed air is used to install the cables within underground ducts. As one of skill in the art appreciates, the use of blowing-in installation is a cheaper, less time consuming, and gentler process for installing communication cables versus traditional installation techniques that utilize a winch and gripper to physically pull the cable through and into a duct.

Further, because these structures 300, 400, 500 are more flexible than communication cable structures requiring glass pultruded rods for strength, these structures 300, 400, 500 are more readily inserted around bends or corners in the ducts. Also, because the reinforcement members 30, 130 are stronger and have more rigidity or antibuckling properties than traditional flexible reinforcement members, attenuation of the optical fibers is prevented due cable shrinkage or expansion during daily or seasonal thermal cycling. Bunching or jamming of the communication cables during installation is also prevented due to the ability to engineer the right amount of cable rigidity to prevent these installation problems.

Figure 21:
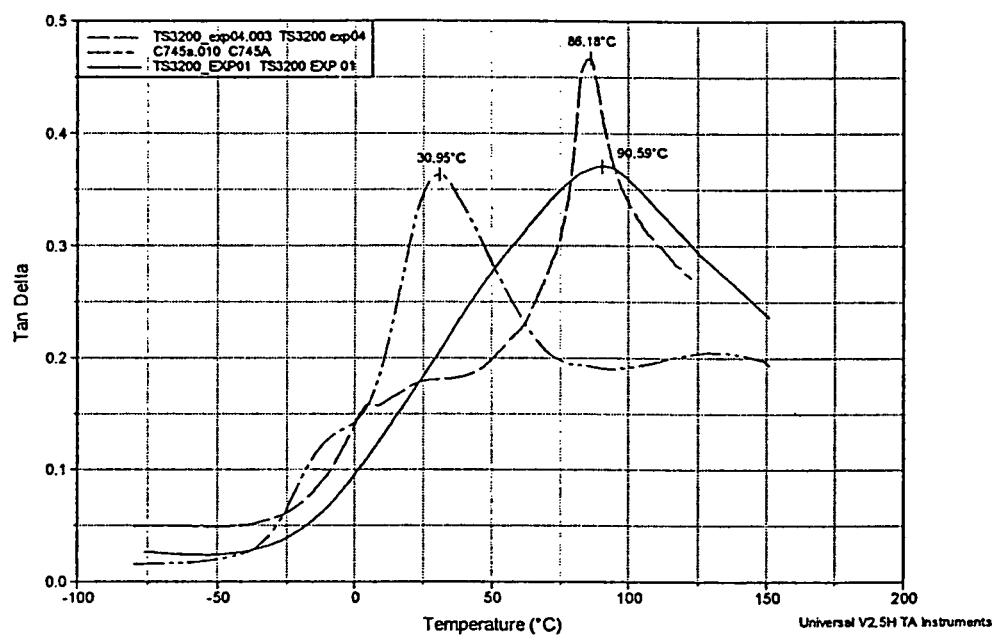
FIG. 21 illustrates a graph comparing glass transition temperatures of traditional coated reinforcements with flexible coated reinforcements of the present invention.

FIG. 21 is a comparative graph depicting glass transition temperatures of traditional coated reinforcements and the flexible coated reinforcements of the present invention. In particular, the glass transition temperature of traditional glass fibers coated with latex and acrylic wax is shown in comparison to glass transition temperatures of glass fibers coated with a low molecular weight mineral wax and an ethylene acrylic acid (EAA) topcoat and glass fibers coated with a low molecular weight mineral wax and ethylene vinyl acetate (EVA) topcoat.

As can be seen in FIG. 21, the standard thermoset CR745A flexible reinforcement has a glass transition temperature, Tg, of 30.96°. Tg is the temperature where an amorphous polymer transitions from a brittle, vitreous material to a more pliable, more flexible, softer material. In contrast to the standard reinforcement, the two thermoplastic-coated reinforcements have Tg's that are about 86° and 91° C., respectively. The higher Tg allows for a processable and more flexible reinforcement at the cable's upper range of the usual operating range of −40° to +80° C. In contrast the polymer transitions to a stiff matrix at the lower temperature range. Being able to control Tg by selective choice of thermoplastic materials or blends of such materials and appropriate modifiers allows for the reinforcement to be customized to precisely meet the cable's performance requirements. As the reinforcement transitions from a flexible to a rigid member, the cable is protected from shrinkage from the polyethylene or other jacketing material as the cable experiences temperature cycles.

Uncontrolled shrinkage can cause optical fiber signal attenuation or catastrophic optical fiber breakage.

While the invention has been described in terms of preferred embodiments, it will be understood, of course, that the invention is not limited thereto since modifications may be made by those skilled in the art, particularly in light of the foregoing teachings.

What is claimed is:

1. A communications cable comprising:
   at least one optical fiber loose tube configured to contain one or more optical fibers;
   a plurality of optical fibers contained and arranged within the loose tube as at least one of: an optical fiber ribbon, one or more optical fiber bundles, and a plurality of individual optical fibers;
   at least one flexible reinforcement member surrounding the at least one loose tube, the flexible reinforcement member including:
   a) a plurality of sized high modulus fibers, the fibers arranged as a plurality of single filaments and/or as a plurality of strand bundles, wherein at least a portion of the surfaces of some high modulus fibers are coated with a sizing composition;
   b) a primary saturant coupled to the high modulus fibers such that the primary saturant saturates and substantially fills interstices between the high modulus fibers, the primary saturant having a low molecular weight and a low melt viscosity with a melting point below approximately 300 degrees Celsius and a melt viscosity of less than approximately 1000 centipoise; and
   c) a high molecular weight polymer topcoat coupled to the primary saturant such that the topcoat surrounds but does not penetrate the primary saturant, the topcoat imparting adhesion properties to the reinforcement member, wherein the flexible reinforcement member includes a pull out force from polyethylene that is greater than about 46 pounds of force per about 0.5 inches of the reinforcement member embedded in polyethylene; and
   a sheath surrounding the at least one flexible reinforcement member and loose tube.

2. The communications cable of claim 1 wherein the sheath includes at least one rigid strength member extending longitudinally through the sheath along the length of the communications cable.

3. The communications cable of claim 1, wherein the at least one optical fiber loose tube includes a plurality of loose tubes, each loose tube including one of: at least one optical fiber ribbon, one or more optical fiber bundles, and a plurality of individual optical fibers, the plurality of loose tubes being spaced, and arranged in relation to a central strength member disposed substantially centrally within the communications cable.

4. The communications cable of claim 3, wherein the central strength member includes at least one water swellable thread or yard surrounding the central strength member.

5. The communications cable of claim 1, wherein the sheath includes an inner sheath, a layer of glass fiber-reinforced tape or reinforcement surrounding the inner sheath, and an outer sheath surrounding the layer of glass fiber-reinforced tape or reinforcement.

6. The communications cable of claim 5, wherein each of the inner sheath and the outer sheath includes a high density polyethylene sheath.

7. The communications cable of claim 1, wherein the sheath includes a high density polyethylene sheath.

8. The communications cable of claim 1, wherein the sheath includes a plurality of reinforcing rods, the plurality of reinforcing rods being evenly spaced within the sheath and equidistant from a center point of the diameter of the cable.

9. The communications cable of claim 1, wherein the at least one loose tube includes a gel-filled loose tube.

10. The low profile flexible reinforcement member of claim 1, wherein the plurality of sized high modulus fibers is selected from the group consisting a plurality of at least one of sized aramid fibers and unsized aramid fibers, a plurality of at least one of sized poly(p-phenylene-2,6-benzobisoxazole) (PBO) fibers and unsized poly(p-phenylene-2,6-benzobisoxazole) (PBO) fibers, a plurality of at least one of sized carbon fibers and unsized carbon fibers, a plurality of sized high silica glass and unsized high silica glass, and a plurality of at least one of sized high tenacity, linearized polyethylene fiber and unsized high tenacity, linearized polyethylene fiber, and combinations thereof.

11. The communications cable of claim 1, wherein the plurality of sized high modulus fibers includes a plurality of sized glass fiber strands selected from the group consisting of E-type glass fiber strands and ECR-type glass fibers.

12. The communications cable of claim 1, wherein the primary saturant of the flexible reinforcement member has a melting point between 100 to about 150 degrees Celsius and a melt viscosity of less than 500 centipoise.

13. The low profile flexible reinforcement member of claim 12, wherein the low molecular weight mineral wax is selected from the group consisting of a low molecular weight microcrystalline wax, a low molecular weight polyalphaolefin wax, a low molecular weight polyethylene wax, or a modified (oxidized or maleated) polyolefin such as polyethylene or polypropylene, and blends thereof.

14. The low profile flexible reinforcement member of claim 1, wherein the primary saturant includes a low molecular weight mineral wax.

15. The communications cable of claim 1, wherein the high molecular weight polymer topcoat is selected from the group consisting of a high molecular weight polyethylene topcoat, a high molecular weight polypropylene topcoat, a high molecular weight ethylene acrylic acid topcoat, a high molecular weight polypropylene and polyethylene copolymer topcoat, an ethylene vinyl acetate copolymer topcoat, a styrene-butadiene-styrene copolymer topcoat, a polybutadiene terephthlate polyether glycol topcoat, polyamides, polyolefins, thermoplastic elastomers, and blends thereof.

16. The communications cable of claim 1, wherein the glass transition temperature (Tg) of the flexible reinforcement member is greater than about 40 degrees Celsius.

17. The communications cable of claim 1, wherein the primary saturant includes between approximately 0.1 and 15 percent of the total weight of the flexible reinforcement member and wherein the higher molecular weight polymer topcoat includes between approximately 0.1 and 35 percent of the total weight of the flexible reinforcement member.

18. The communications cable of claim 1, wherein the primary saturant includes between approximately 5 and 20 percent of the total weight of the flexible reinforcement member and wherein the higher molecular weight polymer topcoat includes between 5 and 20 percent of the total weight of the flexible reinforcement member.

19. A communications cable comprising:
   at least one optical fiber loose tube configured to contain one or more optical fibers;

a plurality of optical fibers contained and arranged within the loose tube as at least one of: an optical fiber ribbon, one or more optical fiber bundles, and a plurality of individual optical fibers;

at least one flexible reinforcement member surrounding the at least one loose tube, the flexible reinforcement member including:

a) a plurality of sized high modulus fibers, wherein at least a portion of the surfaces of some high modulus fibers are coated with a sizing composition, the sized fibers arranged as a plurality of single filaments, wherein the filaments are filamentized strands between about 10 to 25 microns in diameter, and/or as a plurality of strand bundles, wherein the bundles include filaments between about 10 to about 15 microns in diameter with 1000 to 3000 filaments per bundle;

b) a primary saturant coupled to the high modulus fibers such that the primary saturant saturates and substantially fills interstices between the high modulus fibers, the primary saturant a low molecular weight and a low melt viscosity with a melting point below approximately 300 degrees Celsius and a melt viscosity of less than approximately 1000 centipose; and c) a high molecular weight polymer topcoat coupled to the primary saturant such that the topcoat surrounds but does not penetrate the primary saturant, the topcoat impairing adhesion properties to the reinforcement member; and a sheath surrounding the at least one flexible reinforcement member and loose tube.

* * * * *